United States Patent [19]
Fernandez

[11] 3,977,372
[45] Aug. 31, 1976

[54] CARBURETOR VACUUM SHUTOFF CONTROL VALVE

[76] Inventor: John J. Fernandez, 1620 S. Myrtle Ave., Monrovia, Calif. 91016

[22] Filed: June 6, 1975

[21] Appl. No.: 584,660

[52] U.S. Cl. ............................ 123/97 B; 137/480; 123/124 R
[51] Int. Cl.² ....................................... F02D 11/08
[58] Field of Search ........... 137/480, 482; 123/97 B, 123/124, 119 D

[56] References Cited
UNITED STATES PATENTS

| | | | |
|---|---|---|---|
| 1,887,515 | 11/1932 | Pulkinghorn | 123/119 D |
| 2,207,152 | 7/1940 | Huber | 137/480 X |
| 2,284,287 | 4/1942 | Hearn et al. | 123/97 B X |
| 3,287,899 | 11/1966 | Bintz | 123/119 D |
| 3,357,414 | 12/1967 | Meserve | 123/97 B |

Primary Examiner—Charles J. Myhre
Assistant Examiner—William C. Anderson
Attorney, Agent, or Firm—Christie, Parker & Hale

[57] ABSTRACT

A carburetor vacuum shutoff control valve for motor vehicles includes a snap-action spring which senses the the sudden vacuum increase in the carburetor each time the vehicle decelerates. The spring opens the valve during deceleration to allow air to pass through the valve from the atmosphere and immediately prevent the normal fuel mixture from being pulled in through either the idle or high-speed carburetor jets. Thus, during deceleration no gasoline is used, resulting in better fuel economy and no exhaust gas or crankcase emissions.

13 Claims, 5 Drawing Figures

CARBURETOR VACUUM SHUTOFF CONTROL VALVE

BACKGROUND

This invention relates to a carburetor vacuum shutoff control valve for reducing exhaust emissions and improving fuel economy of motor vehicles.

Atmospheric pollution, such as smog, is to a large extent formed by unburned or partially burned hydrocarbons in the exhaust gas emissions of motor vehicles. Incomplete combustion also reduces gasoline mileage.

Some of the worst exhaust gas emissions and fuel economy are produced when the vehicle decelerates, or "drifts", each time the driver takes his foot off the accelerator pedal. In engines having carbureted fuel systems, the throttle valve in the carburetor is closed when the vehicle decelerates, and the engine keeps running from the fuel being sucked into the intake manifold from the carburetor idle jets. During deceleration the pistons reciprocating in the cylinders create a sudden vacuum increase in the carburetor after the carburetor throttle valve closes. This vacuum increase sucks a rich fuel mixture into the intake manifold, which results in poor combustion which, in turn, increases exhaust gas emissions and reduces gasoline mileage during deceleration. Since normal city driving requires the driver to constantly take his foot off the accelerator pedal, the increased emissions and reduced gasoline mileage during deceleration are significant problems.

One solution to the smog problem has been the ignition timing device which retards the spark at idle speeds, but provides a spark advance during deceleration to allow as much time as possible for complete burning of the fuel in the combustion chambers. A typical approach has been to use a modified carburetor and distributor together with a vacuum-sensing control valve for varying the engine timing. The carburetor is specially calibrated to provide leaner fuel mixtures for idle and low speed operation. The distributor has a retarded ignition timing at idle speeds, and a vacuum advance control valve advances the ignition timing during deceleration. The valve relays a vacuum signal to the distributor during deceleration periods to advance the ignition timing and hopefully produce more complete combustion.

The present invention provides a carburetor vacuum-sensitive control valve which is an improvement over the conventional spark advance device because it is substantially more simple in construction and operation; and more importantly, it eliminates fuel being drawn into the combustion chambers during deceleration, which can lead to an overall improvement in gasoline mileage and lower exhaust gas and crankcase emissions.

SUMMARY

Briefly, the vacuum shutoff control valve of this invention includes a housing having one opening communicating with a vacuum port in the intake manifold and another opening leading to the atmosphere. A movable valve in the housing opens and closes the opening to the atmosphere, and is normally maintained in its closed position. The valve senses when the carburetor vacuum existing at the opening to the intake manifold is above a predetermined level and then quickly snaps the valve to its open position. This draws in air from the atmosphere through the valve housing to the intake manifold to reduce the potential carburetor vacuum sufficiently to prevent fuel from being drawn through either the idle or high-speed jets of the carburetor. The air being drawn in through the valve takes the place of the fuel-air mixture normally fed to the engine from the carburetor. Hence, no fuel is burned and no air pollution is produced either from the crankcase or the exhaust.

In a preferred form of the invention, the valve is positioned by a snap-action spring communicating with the opening in the housing leading to the manifold vacuum port. The snap-action spring senses the vacuum which increases in the carburetor during deceleration to snap the valve to its open position. Preferably, the tension in the snap-action spring is adjustable to vary the vacuum level at which the valve can be opened so the fuel control valve can be used as an add-on device and adjusted for the operating conditions of various engines.

These and other aspects of the invention will be more fully understood by referring to the following detailed description and the accompanying drawings.

DRAWINGS

DETAILED DESCRIPTION

Figure 1:
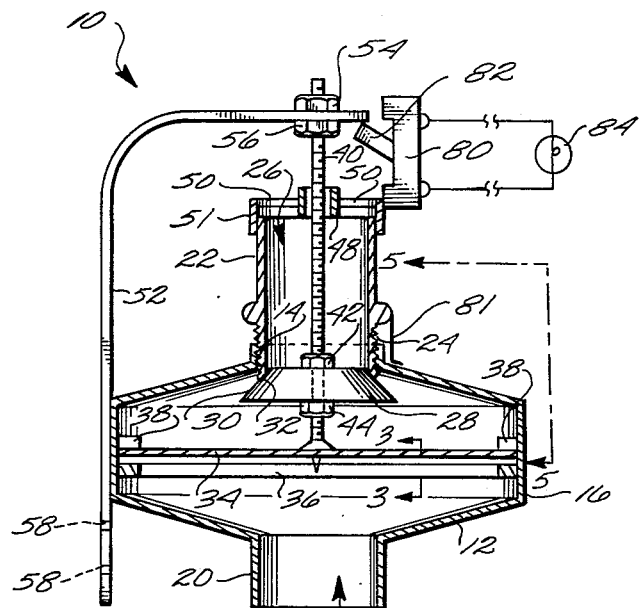
FIG. 1 is a cross-sectional elevation view showing a vacuum-sensitive fuel control valve according to this invention.

Referring to FIG. 1, a carburetor vacuum shutoff control valve 10 according to this invention includes a housing 12 having an internally threaded opening 14 in its top. The housing tapers wider from the inlet opening 14 to a generally cylindrical mid-section 16 which then funnels down to an outlet opening 18 in a tubular outlet section 20. A vertically movable sleeve 22 has an externally threaded lower portion 24 which screws into the threads of the housing opening 14. This allows the sleeve to be turned relative to the housing to adjust the vertical elevation of the sleeve relative to the housing. The opening in the top of the sleeve 22 provides an air inlet opening 26 to the hollow interior of the valve housing 12.

Figure 3:
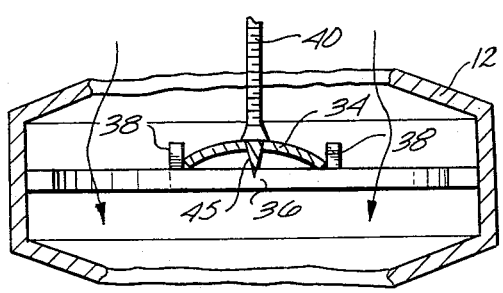
FIg. 3 is a fragmentary cross-sectional elevation view taken on line 3—3 of FIG. 1.

A frusto-conical shaped movable valve element 28 is disposed in the hollow interior of the housing 12 below the sleeve 22. The valve element has a tapered outer surface 30 which seats against the circular bottom lip 32 of the sleeve. The valve element 28 is held in place and positioned by an elongated pressure-sensitive bowed spring 34 which extends laterally across the I.D. of the mid-section 16 of the valve housing 12. As shown best in FIG. 3, the spring 34 is bowed when viewed in transverse cross-section. The spring is the type of snap-action spring, similar to the push-pull type of steel measuring tapes which will withstand an increasing load without deformation and then collapse suddenly when the increasing load reaches a predetermined level. The purpose of this snap-action type spring will be described in greater detail below.

The spring 34 is mounted at its ends on a circular rim 36 which spans the I.D. of the valve mid-section 16. Speced apart upwardly projecting stops 38 are attached to the circular rim 36 along the opposite sides of the spring 34 to hold the spring in a fixed position extending across the diameter of the valve housing.

An elongated upright threaded shaft 40 extends along the central axis through the sleeve 22 and into contact with the center of the spring 34. The valve element 28 is rigidly attached to a lower portion of the threaded shaft by nuts 42 and 44 tightened against the top and bottom surfaces of the valve element. The bottom of the threaded shaft 40 has a pointed section 45 (see FIG. 3) which fits through a central hole in the spring so that the bottom of the shaft 40 is affixed to the spring.

Figure 4:
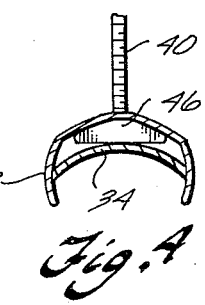
FIG. 4 is a fragmentary cross-sectional elevation view showing an alternate means for attaching a spring tension adjustment member to the vacuum sensitive spring which controls movement of the valve of this invention.

FIG. 4 shows an alternate means for attaching the bottom of the threaded shaft 40 to the spring 34. A rounded pressure-applying foot 46 carried on the bottom of the threaded shaft 40 applies pressure across a relatively broad area of the top surface of the spring 34. A downwardly opening, generally U-shaped clamp 47 carried on the threaded shaft above the pressure-applying foot fits around the opposite edges of the spring 34 to keep the foot 46 in place on top of the spring.

A threaded top portion of the shaft 40 extends outwardly through the inlet opening 26 of the sleeve 22 to a position substantially above the top edge of the sleeve. The shaft extends through a guide at the top of the sleeve which includes a ring 48 which loosely surrounds the top portion of the shaft, and a pair of diametrically opposed and radially extending supports 50 which are rigidly attached to the ring 48. The radial supports 50 are held at their outer ends by a second larger ring 51 which is rigidly attached to the O.D. of the sleeve 22.

A flat metal stabilizer spring 52 having a right-angle bend is loosely fitted around the top portion of the threaded shaft above the guide ring 48. The stabilizer spring also is rigidly attached at its bottom to the O.D. of the mid-section 16 of the valve housing 12. Adjustment nuts 54 and 56 are threaded onto the top portion of the shaft 40 and tightened against the top and bottom of the stabilizer spring 52 to hold the stabilizer spring in a fixed position relative to the shaft. The lower portion of the stabilizer spring protrudes down below the housing and provides a bracket with holes 58 for attaching the valve 10 to a suitable place on the motor vehicle engine, such as on the side of the air cleaner.

Figure 2:
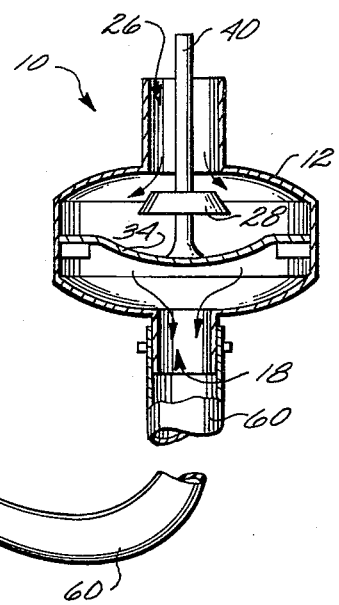
FIG. 2 is a fragmentary cross-sectional schematic elevation view showing the fuel control valve of FIG. 1 in a carbureted fuel system of a typical motor vehicle engine.
Figure 2:
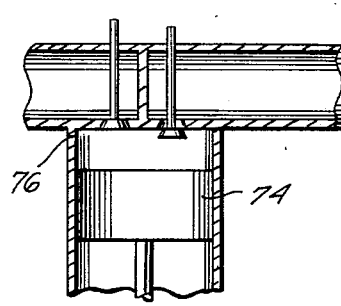

FIG. 2 shows the fuel control valve 10 in use in a fuel system of a typical internal combustion engine used on motor vehicles. The outlet opening 18 of the valve is connected to a hose 60 which runs to a manifold vacuum port 62 in the intake manifold 64 of the engine. The intake manifold is connected below a typical carburetor 66 which includes a venturi 68 and a throttle valve or butterfly valve 70 below the venturi. The throttle valve 70 is shown in FIG. 2 in its closed position which occurs either when the engine idles, or when the driver takes his foot off the accelerator pedal for allowing the vehicle to decelerate. When the throttle valve 70 is closed, and in a normal engine (without the shut-off valve 10), fuel is drawn into the intake manifold from the carburetor idle jet 72. The reciprocating motion of the pistons 74 in the cylinders 76 produces a vacuum below the throttle valve 70 when it is closed, and this vacuum noramlly sucks idling gas 78 into the intake manifold to keep the engine running during idle or deceleration. During idle speeds, a vacuum of between about 18 inches to 20 inches of mercury is normally produced at the base of the carburetor (and at manifold port 62). On the other hand, when the vehicle decelerates, the higher engine speed produces a much stronger vacuum generally in the range of between 23 to 28 inches of mercury. This stronger vacuum sucks in a richer fuel mixture through the idle jets which causes incomplete combustion and therefore serious exhaust gas and crankcase emissions and reduced gasoline mileage. In normal city driving, motor vehicles of necessity decelerate often, which accounts for a large percentage of the air pollution and reduced fuel mileage in stop-and-go traffic conditions.

The fuel control valve 10 overcomes these problems by reacting to the sudden increase in carburetor vacuum each time the motor vehicle decelerates by opening to immediately reduce the vacuum. The valve allows air to flow from the atmosphere directly to the base of the carburetor, taking the place of the rich mixture of fuel and air normally fed to the intake manifold. This results in better fuel economy and more complete combustion which reduces exhaust gas emissions.

More specifically, the large vacuum produced at the manifold vacuum port during deceleration is also present across the outlet opening 18 of the control valve. This vacuum is sensed by the pressure-sensitive spring 34 which will normally remain in its normal unflexed position shown in FIG. 1 during low idle speeds, but will respond to the increased vacuum during deceleration by snapping downwardly to the position shown in FIG. 2. When the spring snaps downwardly it also moves the valve 28 away from its valve seat at the base of the sleeve and opens an air passage from the atmosphere through the interior of the valve housing and through the hose to the intake manifold port 62. This draws air into the bottom of the carburetor below the closed throttle valve 70 to immediately reduce the large vacuum sensed by the spring 34. This immediate reduction of the vacuum instantaneously eliminates fuel being sucked in through the idle and high-speed jets which would otherwise result in a rich fuel mixture and lower fuel mileage and more incomplete combustion during deceleration. Instead, the air drawn in through the valve is fed to the intake manifold in place of the gasoline-air mixture normally fed through the carburetor. Since no fuel is being drawn into the engine cylinders during deceleration, the spark plugs fire in the air, resulting in cleaner burning spark plugs and improved spark plug life. The engine also stays cleaner, partly because of no carbon build up on the spark plugs and on the crankcase oil, and the engine has more power because of the cleaner burning spark plugs.

The tension in the spring 34 is adjustable so that the spring will snap the valve open at any desired vacuum level depending upon the operating conditions of the vehicle. The spring tension setting also affects the engine speed, and therefore the vehicle speed, at which the valve will close when the vehicle comes to a stop or approaches very low speeds. The spring tension is adjusted by turning the sleeve 22 relative to the valve housing 12 to move the sleeve up and down depending upon the desired tension. The valve 28 always remains seated against the bottom lip of the sleeve 22 as the sleeve is adjusted up and down, and as the valve moves move and down so does the threaded shaft 40. Thus, rotation of the sleeve relative to the valve housing will move the threaded shaft 40 relative to the spring 34 and apply a variable amount of tension to the spring. If the sleeve 22 is moved downwardly into the valve housing, the shaft 40 will move downwardly against the spring and apply more pressure to the spring. This will make it easier for the spring to snap to its flexed position in response to a vacuum load, and thereby decrease the amount of vacuum pressure necessary to open the valve. On the other hand, if the shaft 40 is moved away from the spring, more vacuum pressure will be required to move the spring to its flexed position to open the valve.

Figure 5:
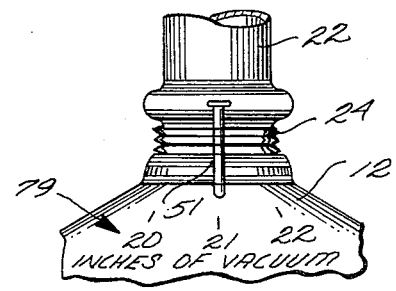
FIG. 5 is an enlarged fragmentary elevation view taken on line 5—5 of FIG. 1 and showing means for indicating the vacuum setting of the fuel control valve.

An indicating device, such as a pointer 81 shown in FIG. 5, is attached to the exterior of the threaded sleeve 22 so it can rotate relative to the outer surface of the valve housing 12. The valve housing can include spaced apart indices 79 representing the number of inches of vacuum at which the valve 28 will snap open for a given setting of the tension in the spring 34. The spring tension is normally set so the valve will open, and also snap closed, at vacuums just above that existing at idle speeds. Assuming that the vacuum existing during idle is between 18 inches to 29 inches, the valve can be set to open, and close, at about 21 inches, as illustrated in FIG. 5. Typically, the adjustment nuts 42 and 44 for positioning the valve 28 on the threaded shaft 40 will be set as a factory adjustment. The main vacuum adjustment will then be made by rotating the sleeve 22 relative to the housing 12 to set the spring tension so the valve will open at the desired vacuum. This main vacuum adjustment then can be locked by either welding the sleeve to the housing so the sleeve can no longer be turned, or by other suitable locking means. The stabilizer spring 52 can then be used as the secondary adjustment for fine-tuning the vacuum setting. This is done by moving the adjustment nuts 54 and 56 up or down to adjust the pressure exerted on the threaded shaft 40 by the stabilizer spring 52. Typically, the correct vacuum setting is determined by running the engine at idle speed with the engine being tuned to the proper fuel-to-air ratio for idle. The sleeve 22 is then turned to the spring tension at which the engine dies. The sleeve is then turned to back off on the spring tension by 2 to 3 inches of vacuum to insure that the valve will not open during idle speeds. This tension setting provides a convenient means for establishing the specific engine speed, in the range of say 700 to 1,000 rpm, at which the valve will snap back to its closed position as the vehicle comes to a stop.

The spring 34 can be any type of snap-action spring which can sense vacuum pressure and control movement of the valve so that the spring will sense a predetermined level of vacuum pressure and immediately snap the valve to its open position when the desired vacuum pressure is sensed. Other types of snap-action mechanisms which are pressure-sensitive, such as a pressure-sensitive diaphragm and coil spring arrangement, also can be used.

The spring 34 has a snap-action characteristic for the purpose of immediately closing the valve 28 when increased vacuum is sensed. A spring with conventional spring rate characteristic, which would open or close the valve in a gradual manner, is not desirable because of the possibility of running the engine on fuel-to-air mixtures which are improper for the engine operating conditions, and could possibly lead to burned valves or other serious conditions.

The size of the valve openings, the distance through which the valve moves when opened, and the type of snap-action spring all can be varied depending upon the type of engine used. For example, these parameters can vary depending upon the engine displacement and the type of cam shaft which the engine has. These variations are adjusted so that sufficient air volume is drawn into the carburetor to reduce the vacuum increase during deceleration and keep the valve 28 constantly open until idle speeds are approached (such as when the vehicle stops). In a fuel control valve I have used on economy-type automobiles, such as a 1971 Fiat 850, the valve openings 18 and 26 have an I.D. of about 15/16 inch, the valve mid-section has an I.D. of about 1½ inches, the width of the bowed spring 34 is about 11/16 inch, the distance from the valve seat 32 to the top opening of the tubular outlet 20 is about 1½ inches, and the valve travel under spring deflection is about one inch.

The control valve also can be used to initiate a warning device to warn others that a driver has taken his foot off the accelerator and the vehicle is starting to decelerate. As shown in FIG. 1, the body 80 of a switch 82 can be affixed to the exterior of the sleeve 22 so the switch is below the top end of the stabilizer spring 52. Thus, when the pressure-sensitive spring 34 is suddenly depressed to open the valve 28, the threaded shaft 40 will move downwardly and pull the end of the stabilizer spring 52 against the switch 82 to close the switch and activate a warning lamp 84. The warning lamp can be on the rear of the vehicle to warn drivers following the vehicle that the vehicle has started decelerating. The switch 82 illustrated in FIG. 1 is a spring-loaded switch which will return to its original open position when the valve moves back to its closed position and the end of the stabilizer spring moves out of contact with the switch.

Automobiles with power equipment, such as power brakes, which operate from the carburetor vacuum will require a modification of the shutoff valve 10. In these instances, an electrical valve control circuit (not shown) is activated by the hydraulic cylinder (not shown) which operates the power brakes. For example, the electrical control circuit may be activated by the brake light circuit when the brake lights are illuminated in response to applying the brakes. When the brake pedal is applied, a solenoid (not shown) at the top of the threaded shaft 40 is activated by the electrical control circuit. The solenoid appplies an upward pressure on the shaft to close the valve 28. This instantly restores the normal vacuum to the power brakes. A similar electrical control circuit can be used to override the vacuum shutoff valve for other equipment operated by the carburetor vacuum.

I have used the control valve 10 on a 1971 Fiat 850. The device was attached to a warning lamp which immediately indicated that the valve 28 opened each time the automobile decelerated and stayed open continuously until shortly before the automobile came to a stop position. The following tests were made with the device on the automobile described above. The automobile had 125,000 kilometers on the speedometer, it had a manual transmission, a high-test gasoline was used. The control valve was adjusted so the valve would open at about 22 inches of vacuum and would close when the automobile deceleration speed reaches 15 mph. Prior tests for city driving of the automobile without the fuel control device indicated that the automobile normally obtains 24 to 26 miles per gallon.

Test A - Driver No. 1

2 passengers, used 2.5 gallons in 100 miles, or 40 miles per gallon. There were 148 stops which included stops at signal lights, stop signs, and parking.

Test B - Driver No. 1

2 passengers, 115 stops, used 2.6 gallons in 100 miles, or 38.5 miles per gallon.

Test C - Driver No. 1

2 passengers, 66 stops, used 2.5 gallons in 100 miles, or 40 miles per gallon.

Test D - Driver No. 2

2 passengers, 174 stops, used 2.7 gallons in 100 miles, or 37 miles per gallon.

I claim:

1. A carburetor vacuum shutoff control Valve for use in a fuel system of an internal combustion engine which includes a carburetor having a main throttle valve for controlling the flow of fuel to the engine cylinders, and an intake manifold for distributing the flow of fuel from the carburetor to the engine cylinders, in which the intake manifold has a vacuum port adjacent the carburetor, and in which operation of the engine during decelerating travel of the vehicle has the potential for producing a carburetor vacuum in the intake manifold below the carburetor when the throttle valve of the carburetor is closed, the control valve comprising:
a. a valve housing having a hollow interior, a first opening to the hollow interior for communicating with the vacuum port of the intake manifold, and a second opening to the hollow interior spaced from the first opening for communicating with the atmosphere;
b. a movable valve member in the interior of the housing for opening and closing the second opening to the atmosphere; and
c. a valve positioning spring for controlling movement of the valve member between its open and closed positions, the valve positioning spring comprising an elongated snap-action bowed spring engaged with the valve member and extending through the hollow interior of the valve housing and being exposed to the first opening therein to continuously sense the carburetor vacuum present at the first opening, the bowed spring having a generally linear, non-flexed normal position to maintain the valve member normally in its closed position, the bowed spring being sensitive to the carburetor vacuum at the first valve opening increasing above a predetermined level and of itself being responsive to said increased vacuum to suddenly collapse under said vacuum and move with a snapping action from its normal position to a flexed position to consequently move the valve member to its open position away from the second opening for allowing air from the atmosphere to enter the interior of the valve housing through the first opening and pass through the second opening to the intake manifold to reduce the potential carburetor vacuum therein and replace the fuel mixture which would normally enter the intake manifold from the carburetor, the bowed spring further being sensitive to the carburetor vacuum being reduced from said predetermined level and of itself being responsive to said vacuum reduction to snap back to its normal position and move the valve member back to its closed position to shut off the flow of air through the second valve opening.

2. Apparatus according to claim 1 in which the bowed spring extend across the hollow interior of the valve housing and occupies only a portion of the cross-sectional area of the hollow interior so that air admitted to the valve housing can pass through the second opening, around the spring, and through the first opening.

3. Apparatus according to claim 2 in which the valve member includes a spring tension adjusting member extending from the valve member into engagement with the top surface of the snap-action spring, the tension adjusting member having means resting on the top surface of the snap-action spring, and a generally channel-shaped bracket extending from the pressure-adjusting member around opposite sides of the snap-action spring to hold the tension adjusting member in a fixed position resting on the top surface of the spring.

4. Apparatus according to claim 3 including an adjustable means for applying pressure to the bowed spring for altering the tension in the spring to thereby adjust the vacuum levels at which the spring snaps the valve to its open position and then snaps the valve back to its normally closed position.

5. Apparatus according to claim 4 in which the spring pressure adjusting member comprises a threaded sleeve being threadably engaged with the valve housing, and in which the second opening of the housing is formed by a portion of the threaded sleeve extending into the interior of the housing, and an elongated spring tension adjusting member extending from the valve member into contact with the bowed spring, the valve member being releasably seated on the second opening provided by the threaded sleeve, the threaded sleeve being rotatable relative to the valve housing to raise and lower the valve member and tension adjusting member as a unit to adjust the contact pressure between the pressure-adjusting member and the bowed spring and thereby adjust the tension in the spring so as to control the vacuum levels at which the spring will open the valve member.

6. Apparatus according to claim 5 including an indicator member attached to the exterior of the rotatable sleeve, and indexing means on the valve housing to which the indicator member can point to indicate the spring tension and therefore the vacuum at which the spring will open the valve member.

7. Apparatus according to claim 5 in which the spring pressure-adjusting member comprises an elongated threaded shaft extending through the valve member and through the second opening provided by the sleeve to a position above the sleeve; an elongated, flexible stabilizing member rigidly attached to the exterior of the valve housing and extending into a position surrounding the threaded shaft above the sleeve; and adjusting nuts on opposite sides of the stabilizer member and threadably engaged with the threaded shaft for providing a secondary adjustment of the tension applied by the threaded shaft to the spring.

8. Apparatus according to claim 1 including switch means responsive to movement of the valve member between its open and closed positions to close and open the switch means, respectively, and visual indicating means responsive to movement of the switch means between its closed and open positions to visually indicate movement of the valve member between its open and closed positions, respectively.

9. A carburetor vacuum shutoff control valve for use in a fuel system of an internal combustion engine which includes a carburetor having a main throttle valve for controlling the flow of fuel to the engine cylinders, and an intake manifold for distributing the flow of fuel from the carburetor to the engine cylinders, in which the intake manifold has a vacuum port adjacent the carburetor, and in which operation of the engine during decelerating travel of the vehicle has the potential for producing a carburetor vacuum in the intake manifold below the carburetor when the throttle valve of the carburetor is closed, the control valve comprising:
a. a valve housing having a hollow interior, a first opening to the hollow interior for communicating with the vacuum port of the intake manifold, and a second opening to the hollow interior spaced from the first opening for communicating with the atmosphere;
b. a movable valve member in the interior of the housing for opening and closing the second opening to the atmosphere;
c. a valve positioning spring for controlling movement of the valve member between its open and closed positions, the valve positioning spring comprising an elongated snap-action bowed spring engaged with the valve member and extending through the hollow interior of the valve housing and being exposed to the first opening therein to continuously sense the carburetor vacuum present at the first opening, the bowed spring having a generally linear, non-flexed normal position to maintain the valve member normally in its closed position, the bowed spring being sensitive to the carburetor vacuum at the first valve opening increasing above a predetermined level and of itself being responsive to said increased vacuum to suddenly collapse under said vacuum and move with a snapping action from its normal position to a flexed position to consequently move the valve member to its open position away from the second opening for allowing air from the atmosphere to enter the interior of the valve housing through the first opening and pass through the second opening to the intake manifold to reduce the potential carburetor vacuum therein and replace the fuel mixture which would normally enter the intake manifold from the carburetor, the bowed spring further being sensitive to the carburetor vacuum being reduced from said predetermined level and of itself being responsive to said vacuum reduction to snap back to its normal position and move the valve member back to its closed position to shut off the flow of air through the second valve opening;
d. adjustable means for applying pressure to the bowed spring for altering the tension in the spring to thereby adjust the vacuum level at which the spring snaps the valve to its open position; and
e. indexing means on the exterior of the valve housing for indicating the adjusted spring tension and therefore the vacuum level at which the spring opens the valve member.

10. Apparatus according to claim 9 in which the spring pressure adjusting member comprises a threaded sleeve being threadably engaged with the valve housing, and in which the second opening of the housing is formed by a portion of the threaded sleeve extending into the interior of the housing, and an elongated spring tension adjusting member extending from the valve member into contact with the bowed spring, the valve member being releasably seated on the second opening provided by the threaded sleeve, the threaded sleeve being rotatable relative to the valve housing to raise and lower the valve member and tension adjusting member as a unit to adjust the contact pressure between the pressure-adjusting member and the bowed spring and thereby adjust the tension in the spring so as to control the vacuum levels at which the spring will open the valve member.

11. A fuel system for an internal combustion engine comprising:
a. means for feeding fuel to the engine;
b. an intake manifold for distributing the flow of fuel from the fuel feeding means to the engine, the intake manifold having a vacuum port adjacent the fuel feeding means and in which operation of the engine during decelerating travel of the vehicle has the potential for producing a vacuum in the intake manifold; and
c. a vacuum shutoff valve for reducing said vacuum during decelerating travel of the vehicle, the shutoff valve including
  1. a valve housing having a hollow interior, a first opening to the hollow interior for communicating with the vacuum port of the intake manifold, and a second opening to the hollow interior spaced from the first opening for communicating with the atmosphere,
  2. a movable valve member in the interior of the housing for opening and closing the second opening to the atmosphere,
  3. a valve positioning spring for controlling movement of the valve member between its open and closed positions, the valve positioning spring comprising and elongated snap-action bowed spring engaged with the valve member and extending through the hollow interior of the valve housing and being exposed to the first opening therein to continuously sense the carburetor vacuum present at the first opening, the bowed spring having a generally linear, non-flexed normal position to maintain the valve member normally in its closed position, the bowed spring being sensitive to the vacuum at the first valve opening increasing above a predetermined level and of itself being responsive to said increased vacuum to suddenly collapse under said vacuum and move with a snapping action from its normal position to a flexed position to consequently move the valve member to its open position away from the second opening for allowing air from the atmosphere to enter the interior of the valve housing through the first opening and pass through the second opening to the intake manifold to reduce the potential vacuum therein and replace the fuel mixture which would normally enter the intake manifold from the fuel feeding means, the bowed spring further being sensitive to the vacuum being reduced from said predetermined level and of itself being responsive to said vacuum reduction to snap back to its normal position and move the valve member back to its closed position to shut off the flow of air through the second valved opening.

12. A fuel system according to claim 11 including an adjustable means for applying pressure to the bowed spring for altering the tension in the spring to thereby adjust the vacuum levels at which the spring snaps the valve to its open position and then snaps the valve back to its normally closed position.

13. A fuel system according to claim 12 including indexing means on the valve housing exterior for indicating the spring tension and therefore the vacuum at which the spring will open the valve member.

* * * * *

UNITED STATES PATENT AND TRADEMARK OFFICE
CERTIFICATE OF CORRECTION

PATENT NO. : 3,977,372
DATED : August 31, 1976
INVENTOR(S) : John J. Fernandez

It is certified that error appears in the above–identified patent and that said Letters Patent are hereby corrected as shown below:

[57] Abstract, line 2, after "senses" delete "the".

Col. 3, line 9, "Speced" should be -- Spaced".

Col. 4, line 5, "noramlly" should be -- normally --.

Col. 5, line 5, "move" should be -- up --.

Col. 6, line 54, "appplies" should be -- applies --;

line 68, "a" should be -- and --.

Col. 10, line 39, "and elongated" should be -- an elongated --;

line 68, "valved" should be -- valve --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*